Sept. 24, 1968   JIRO SASAKI   3,402,818
OSMOSIS FILTERING METHOD AND DEVICE
Filed Sept. 14, 1964
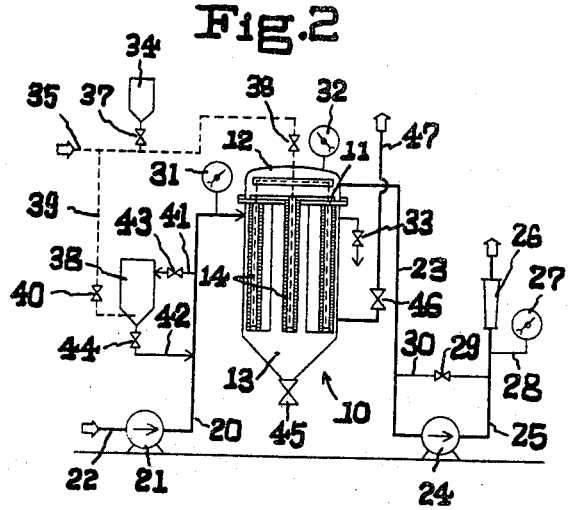
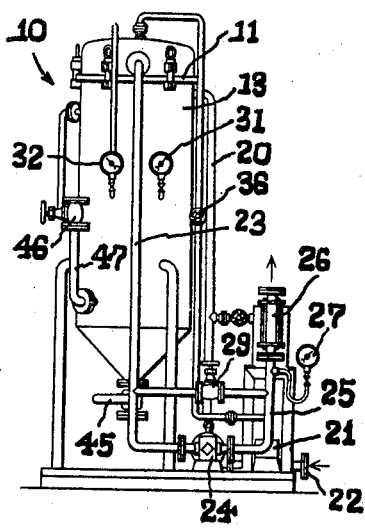
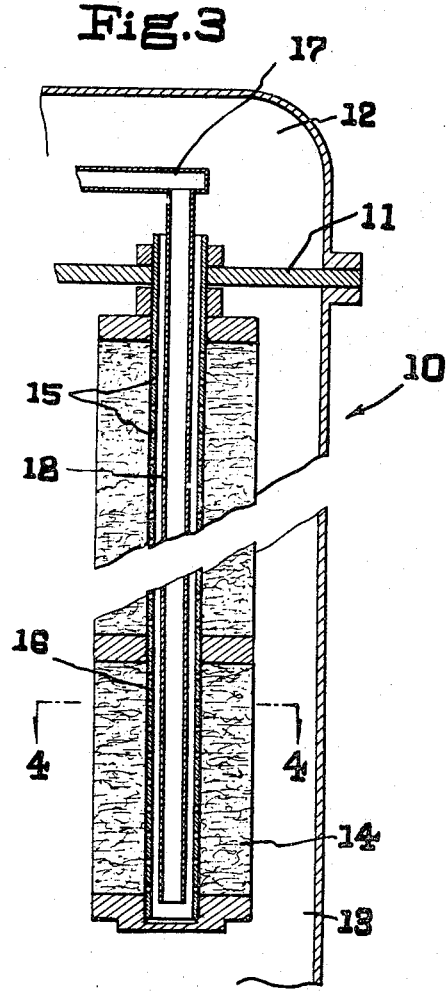
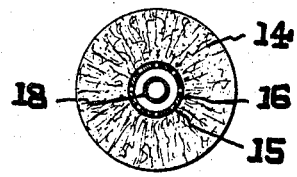
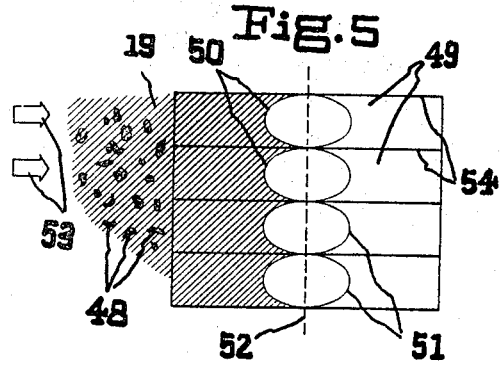
INVENTOR
Jiro Sasaki
BY Olson, Trexler, Walters & Bushnell
ATTORNEY

United States Patent Office 3,402,818
Patented Sept. 24, 1968

3,402,818
OSMOSIS FILTERING METHOD AND DEVICE
Jiro Sasaki, 881 Suminodo, Yata-cho,
Higashisumeyoshi-ku, Osaka, Japan
Filed Sept. 14, 1964, Ser. No. 396,278
7 Claims. (Cl. 210—82)

This invention relates to an osmotic filtering method and apparatus for liquid suspension of fine grains and more especially to a super-precision adhesion osmotic filtering method and apparatus through an ingenious use of the Brownian motion and adhesion which are the characteristics of the fine grains suspended in a liquid and also the elemental adhesion of the liquid.

Hitherto, precision filtration as a means of separating fine grains has been controlled by the size of holes of the filter medium that is in use as a filter body and has required disposal of solid material that fails to pass through the said holes as cake; that is the so-called controlled filtering method of either pressure or absorption type has been in use. However, in this method, innumerable super fine passages of micron or millimicron size are difficult to be uniformly formed by stages to meet the required degree of cleanliness. In addition, the cake sticking to the filter body serves to increase the difference of the filtering pressure, and as a result, is pressed harder, and then a further increase of the filtering pressure ensues; in this way, this vicious circle keeps on going. This phenomenon causes filtering troubles by the blocking of the filter body within a very short time. And, as such, the super precision filtration by means of the well-known controlled filtering method has been far from being put into practice.

This invention has radically improved these faults of the said controlled filtering method and created quite a new filtering method and is an adhesion capillary osmosis filtering method and apparatus making use of the Brownian motion and adhesion which are the characteristics of the fine grains suspended in the filtrate and the capillary osmosis which is the elemental phenomenon of the liquid.

Fine grains in suspension perform the Brownian or grain motion brought about by the molecular motion but after contact by the fine grains or other substance, they may become adhesive and coagulate. In this invention separation is effected by using these characteristics. First, in order to increase chances of adhesion, a spacious adhesion area on the surface contacting the liquid to be filtered must be offered. In this case, the fine grains coming nearer the filter medium are unable to reach the capillary passage but stay on the liquid-contacting surface of the filter medium, by reason of the grain motion, and start falling off and precipitating after gradually increasing in size. The liquid itself permeates into the capillary passages and assumes forward motion by reason of its own properties in relation to the characteristics of the capillary passages.

This invention aims at carrying out the capillary osmosis as effectively as possible by forming a thick-walled osmotic filter body of material having innumerable capillary passages and having a spacious adhesion area on the surface of the filter body contacting the liquid to be treated in a filter tank. There is a pump at the side of the base to send filtrate under a slight pressure of about 0–1 kg./cm.² while at the same time there is a suction pump at the discharge side of purified fluid to suction it under the pressure of minus 0–1; fundamentally those two pumps are operated at the same time to undergo the fixed-quantity filtration continuously by ingeniously mingling the plus side (supply under slight pressure) and the minus side (suction for discharge) making the zero osmosis space that will not be influenced by the atmospheric pressure at the center.

The above-stated "slight pressure of about 0–1 kg./cm.²" does not mean the charging under pressure as is generally termed in the terminology of filter machines but means the pressure slightly higher than that needed for supplying the required quantity of fluid, so that even when the minimum charging under pressure is needed due to viscosity of fluid or the pollution of material, it would be better not to raise up the pressure higher than 1 kg./cm.².

One of the objects is to maintain only the slight difference of pressure so that care must be taken to keep the transferring pressure as little as possible and to prevent the sticking cake from getting pressed and solidified and to allow the free and violent movement of molecules as far as possible; in other words, the purified fluid up to the moment of being suctioned by the suction pump does not need any pressure and instead must be given chances of contacting with the adhesion space as often as possible.

Another object of this invention is to employ a thick-walled osmotic material as the filter body, to make the liquid molecules in the basis fluid leave the filtering medium by means of capillary osmosis, to make the fine grains coagulate jointly with the succeeding fine grains loosely sticking to the adhesion area on the outside and cause falling-off and precipitation by gravity. In the osmotic filter medium, the slight pressure difference is done more effectively and the value of the transferring pressure at each unit area of each part of filter medium is exceedingly low. In the case of a hollow cylindrical filter medium, the filtering area gradually becomes less from the outer circumference to the inside circumference but in the case of the movements of plus slight pressure and minimum suction, the osmosis speed that has been increased by the suction becomes faster at the inside circumference where the filter area or the number of small holes is less than at the outer circumference so that the pollution by adhesion in the filter medium becomes remarkably less and the life of the filter body against the pollution is prolonged.

Another object of this invention is that super precision filtration with substantially continuous filtration is possible with this invention.

In short this invention has made it possible to avoid filtration troubles of the filter body by effectively using a loose adhesion of the suspended fine grains and capillary osmosis.

The above and further objects will be obvious upon an understanding of the illustrative embodiment about to be described, or will be indicated in the appended claims, and various advantages not described herein will occur to one skilled in the art upon employment of the invention in practice.

A preferred embodiment of the present invention has been chosen for purposes of illustration and description and is shown in the accompanying drawings, forming a part of the specification, wherein:

In the illustration:
FIG. 1 is a front view of one embodiment of the device of the present invention.
FIG. 2 shows an outline of piping diagram of the device illustrated in FIG. 1.
FIG. 3 is a longitudinal fragmentary and enlarged section of a portion of the device shown in FIG. 1.
FIG. 4 is a section of line 4—4 in FIG. 3.
FIG. 5 is the enlargement of a portion of FIG. 4 and merely serves as an example.

The device shown in the said embodiment has a filter tank 10, which is divided into two portions, i.e. a purified fluid chamber 12 and base liquid chamber 13 by a partition or end-plate 11. In the chamber 13, are many hollow, cylindrical, multi-holed, thick-walled osmotic filter bodies 14 fixed on the said end-plate 11. In the hollow portion of the filter body 14 is an inner tube 16 having multiple circulation holes 15 spreading over nearly the whole length of the filter body 14; in the inner tube 16 is a center tube 18, the upper end of which is fixed on a back-wash tube 17 within the fluid purifying chamber 12 while the lower end is open to the inner tube 16.

One end of the tube 20 whose function is to send the base fluid or suspension 19 on to the chamber 13 is fixed on the chamber 13 while the outer end is fixed on the pressure pump 21. In order to feed the base liquid 19 to the pump 21 from the base liquid tank (not illustrated), the base liquid induction tube 22 is employed. 31, 32 are the pressure gauges respectively to read the pressure in the tube 20 and the chamber 12. 33 represents an air valve. One end of the purified liquid tube 23 that sends out the purified liquid from the chamber 12 is fixed on the chamber 12 with the other end on the suction pump 24. In order to feed the purified liquid from the suction pump 24 to the pure liquid tank (not illustrated) the purified liquid charging tube 25 is employed. On the purified liquid charging tube 25 a flow meter 26 is provided. For pressure reading of the purified liquid in the charging tube 25 a pressure gauge 27 is provided on the tube 25 through a guide 28. 29 is a regulating valve provided on a guide tube 30 directly connecting the purified liquid tube 23 and the charging tube 25.

For the purpose of back-washing, there is an appended device which contains a purifying material tank 34, an air charging tube 35, a back-wash valve and a valve for purifying material 37.

On the air feeding tube 39 which is branched off from the air charging tube 35 there is an air stirring valve 40 disposed in advance of its connection with an aid material tank 38 at its end. To link the aid material tank 38 and the charging tube 20 there are tubes 41, 42 equipped with a base liquid feeding valve 43 and an aid material adding valve 44. Below the chamber 13 is a rotary valve 45 for the purpose of taking out cakes. At a side of the chamber 13 is an overflow tube 47 to regulate the amount of base liquid in the chamber 13 and the overflow tube 47 has an overflow regulating valve 46. The overflowed base liquid 19 is sent to the charging tube 22 through the overflow tube 47.

When the overflow tube 47 is effectively used, it is possible to keep the pressure reading of the pressure gauge 31 constant.

The filtrate or the base liquid 19 reaches the charging pump 21 through the induction tube 22, thence flows to the chamber 13 of the filter tank 10 through the charging tube 20, in which case, when found necessary, an aiding material existing in the aiding material tank 38 will be added to the base liquid 19. When the base liquid 19 is excessive, the excess amount will be sent back to the induction tube 22 through the overflow tube 47.

Next, the base liquid 19 starts penetration to the filter body 14 that is provided within the chamber 13. As illustrated in FIGS. 3 and 4, the filter body 14 is thick-walled, hollow and cylindrical and has a somewhat rough surface on the outer circumference; the vast surface of fine grains, that form the base material, contacts with the fluid at the adhesion space.

Inside the filter body 14 are compressed, resintreated fabrics that form innumerable capillary tubes of micron size. The inner tube 16 serves to strengthen the filter body 14 and to discharge the purified liquid. The suspended fine grains 48 existing in the base liquid 19 loosely stay on the outer circumference of the filter body 14 and only the liquid particles run out on to the inside of the inner tube 16 through the circulation holes 15 by means of capillary osmosis to be gathered in the purified fluid chamber 12. It is the most important point of the present invention to let the suspended fine grains 48 loosely stay on the adhesion area at the outer circumference of the filter body 14. That is, by coagulation the particles sink or fall-off and settle to avoid causing filtration troubles which cause increased necessity for back-wash. FIG. 5 clearly illustrates a comparison between this portion, viz. osmosis space and an example of the conventional model. According to this, the suspension or base liquid 19 penetrating into the capillary tube 49 has been sustaining excessive resistance from the filter medium in the case of conventional methods which form the fluid surfaces 50 or 51. The fluid surface 50 is mainly seen in the case of pressure type, in which the base liquid or suspension 19 makes a free particle-like movement on the surrounding wall 54 of the capillary tube 49, and at the center portion, takes the form of concave due to the existence of atmospheric pressure and others. The surface 51 is mainly seen in the case of suction type. But the present invention can make the surface nearly a stragiht-line-like surface 52. The arrow 53 indicates the moving direction of the base fluid.

The purified liquid is suctioned into the purified liquid chamber by the suction pump 24 through the tube 23 and then sent to the purified liquid tank (not illustrated) through the tube 23 and the charging tube 25. In this way, the charging pump 21 side (slight pressure feeding under plus pressure) and the suction pump 24 side (synchronizing suction and exhaust under minus pressure) work simultaneously, and by so doing, a substantially continuous super precision filtration can be done.

In the case of filter body 14 being back-washed, if the charging of the base liquid 19 to the filter tank 10 and the charging of the purified liquid are halted and the back-wash valve 36 and the valve 37 for purifying material are open, the mixed liquid will move in the filter tank 10 as shown by dotted line in FIG. 2. That is, the mixed liquid moves downward in the center tube 18 provided in each filter body 14 through the back-wash tube 17, then moves upward through a clearance between the inner tube 16 and the center tube 18 from the opening at the lower end of the center tube 18; in the meantime, as it is discharged outside from the circulation holes 15, it gradually penetrates into the filter medium. By this action, any cakes in the filter medium are taken outside the filteration medium and sink downward and discharged to the outside of the system from the cake-discharging rotary valve 44. As the back-wash fluid is arranged penetrating into the filter medium this is a good contrast with the conventional back-wash process by which it has been impossible to completely back-wash the lower part of the filter body; in the present invention, however, the said arrangement has resulted in placing the stress on the highly important back-washing of the lower part so that the back-wash of all the system could be done as occasion demands.

In the said explanations, it seems clear how useful the present invention is for the osmotic filtering method and apparatus, and the form and structure of the device and the readjustment of the parts, etc. can be changed without departing from the spirit and scope of the invention. Because, of this, the present invention is not confined to the illustrations and descriptions already made.

What I claim is:

1. An osmotic filtering method in which the liquid to be filtered is contacted with a filter body having a large adhesion area and innumerable capillary passages connected therewith, passing the liquid into contact with the adhesion area for loose adhesion and collection thereon of impurities to be filtered out with substantial precipitation thereof by gravity after increasing in size without substantial penetration of the filter body, and withdrawing purified liquid from the opposite side of the filter body after capillary movement thereof through the capillary passages.

2. The method of claim 1 with slight charging and suction pressures maintained at such small differential to prevent the impurities on the adhesion area from caking thereon to any substantial degree.

3. The method of claim 2 with permissive back-washing with a mixture of air and washing material.

4. A filtering apparatus comprising a thick-walled filter body having a large adhesion area disposed to contact the incoming liquid to be filtered and innumerable capillary passages connected with the adhesion area, a feed pump for feeding liquid at minute pressure to a chamber on the inlet side of said filter body, and a suction pump disposed to withdraw purified liquid from a chamber on the outlet side of said filter body, said pumps coacting to maintain the pressure differential substantially minimal to permit loose adhesion of impurities on the adhesion area and precipitation therefrom without substantial compression thereagainst and capillary rate of passage of purified liquid through the capillary passages of the filter body.

5. A filtering apparatus as claimed in claim 4, wherein the filter body is hollow and cylindrical with the liquid passing from the outside to the inside thereof.

6. A filtering apparatus as claimed in claim 5, wherein there is provided back-wash fluid delivery means including a center imperforate tube within the hollow filter body opening at the lower end thereof to deliver the back-wash fluid.

7. A filtering apparatus as claimed in the claim 6, wherein said center tube is disposed within a perforated tube lining the interior surface of the filter body.

References Cited

UNITED STATES PATENTS

| | | | |
|---|---|---|---|
| 2,911,101 | 11/1959 | Robinson | 210—458 |
| 3,144,407 | 8/1964 | Olmos | 210—307 |
| 3,186,552 | 6/1965 | Cutler | 210—457 |
| 2,681,153 | 6/1954 | Armbrust | 210—333 X |
| 2,952,363 | 9/1960 | Griswold | 210—333 X |
| 3,140,256 | 7/1964 | Martin et al. | 210—416 X |
| 3,268,442 | 8/1966 | Pall et al. | 210—23 |
| 3,285,420 | 11/1966 | Muller | 210—333 X |

OTHER REFERENCES

Webster's Seventh New Collegiate Dictionary, p. 597 relied upon. G&C Merriam Co., Publishers, Springfield, Mass.

REUBEN FRIEDMAN, *Primary Examiner.*

F. SPEAR, *Assistant Examiner.*